(12) United States Patent
Zurk et al.

(10) Patent No.: US 10,669,900 B2
(45) Date of Patent: Jun. 2, 2020

(54) INTERNAL COMBUSTION ENGINE HAVING A VALVE ACTUATION DEVICE

(71) Applicant: AVL LIST GMBH, Graz (AT)

(72) Inventors: Andreas Zurk, Weinburg (AT); Martin Klampfer, Hitzendorf (AT); Gernot Hirschl, Althofen (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 16/318,343

(22) PCT Filed: Jul. 20, 2017

(86) PCT No.: PCT/AT2017/060183
§ 371 (c)(1),
(2) Date: Feb. 13, 2019

(87) PCT Pub. No.: WO2018/014065
PCT Pub. Date: Jan. 25, 2018

(65) Prior Publication Data
US 2019/0242278 A1    Aug. 8, 2019

(30) Foreign Application Priority Data
Jul. 20, 2016 (AT) .................................. 50662/2016

(51) Int. Cl.
*F01L 3/20* (2006.01)
*F01L 13/06* (2006.01)
(Continued)

(52) U.S. Cl.
CPC .................. *F01L 3/20* (2013.01); *F01L 1/08* (2013.01); *F01L 1/181* (2013.01); *F01L 1/267* (2013.01);
(Continued)

(58) Field of Classification Search
CPC ........ F02D 13/04; F02D 13/0246; F01L 3/20; F01L 2003/11; F01L 13/06; F01L 13/065;
(Continued)

(56) References Cited

U.S. PATENT DOCUMENTS

| 4,930,471 A | 6/1990 | Korner et al. |
| 5,609,134 A | 3/1997 | Schmidt et al. |

(Continued)

FOREIGN PATENT DOCUMENTS

| AT | 3600 U1 | 5/2000 |
| AT | 4387 U1 | 6/2001 |

(Continued)

*Primary Examiner* — Jacob M Amick
(74) *Attorney, Agent, or Firm* — Dykema Gossett PLLC

(57) ABSTRACT

Aspects of the present disclosure are directed to an internal combustion engine having a valve actuation device and at least one first exhaust valve and one second exhaust valve per cylinder. The first and second exhaust valves may be actuated together in at least one operating area of the internal combustion engine, via an exhaust valve bridge and a first valve lifter, by a first cam lobe of a first exhaust cam arranged on a camshaft. The camshaft having a second exhaust cam with at least one additional cam lobe and at least one second cam lobe A transmission device being arranged in the functional path between the second exhaust cam and the second exhaust valve, the transmission device allowing an idle stroke to be activated or deactivated. The first exhaust cam and the second exhaust cam are configured and arranged to be rotatable relative to one another.

14 Claims, 4 Drawing Sheets

(51) Int. Cl.
*F01L 1/08* (2006.01)
*F01L 1/18* (2006.01)
*F02D 13/04* (2006.01)
*F01L 13/00* (2006.01)
*F02D 13/02* (2006.01)
*F01L 1/344* (2006.01)
*F01L 1/26* (2006.01)
*F01L 3/22* (2006.01)
*F16K 1/54* (2006.01)
*F01L 3/00* (2006.01)

(52) U.S. Cl.
CPC .............. *F01L 1/344* (2013.01); *F01L 3/22* (2013.01); *F01L 13/0047* (2013.01); *F01L 13/06* (2013.01); *F02D 13/0246* (2013.01); *F02D 13/04* (2013.01); *F16K 1/54* (2013.01); *F01L 2003/11* (2013.01); *F01L 2003/25* (2013.01)

(58) Field of Classification Search
CPC ..... F01L 3/22; F01L 3/10; F01L 31/12; F01L 1/04; F01L 1/042; F01L 1/10; F01L 13/0026; F01L 1/08; F01L 1/344; F01L 1/267; F01L 1/181; F01L 13/0047; F16K 1/54
See application file for complete search history.

(56) References Cited

U.S. PATENT DOCUMENTS

| | | |
|---|---|---|
| 6,000,374 A | 12/1999 | Cosma et al. |
| 8,631,776 B2 | 1/2014 | Dietel et al. |
| 9,188,030 B2 | 11/2015 | Takahashi |
| 9,903,240 B2 | 2/2018 | Altherr et al. |
| 2008/0215228 A1 | 9/2008 | Krebber-Hortmann |
| 2010/0288229 A1 | 11/2010 | Lancefield et al. |
| 2011/0303173 A1 | 12/2011 | Dietel et al. |
| 2012/0260873 A1 | 10/2012 | Dietel et al. |
| 2012/0298057 A1* | 11/2012 | Janak ............... F01L 1/08 123/90.12 |
| 2014/0083381 A1* | 3/2014 | Roberts ............ F01L 1/08 123/90.15 |

FOREIGN PATENT DOCUMENTS

| | | |
|---|---|---|
| DE | 3839450 C2 | 9/1991 |
| DE | 4125831 A1 | 10/1992 |
| EP | 1945918 B1 | 2/2009 |
| WO | 2015177127 A1 | 11/2015 |

* cited by examiner

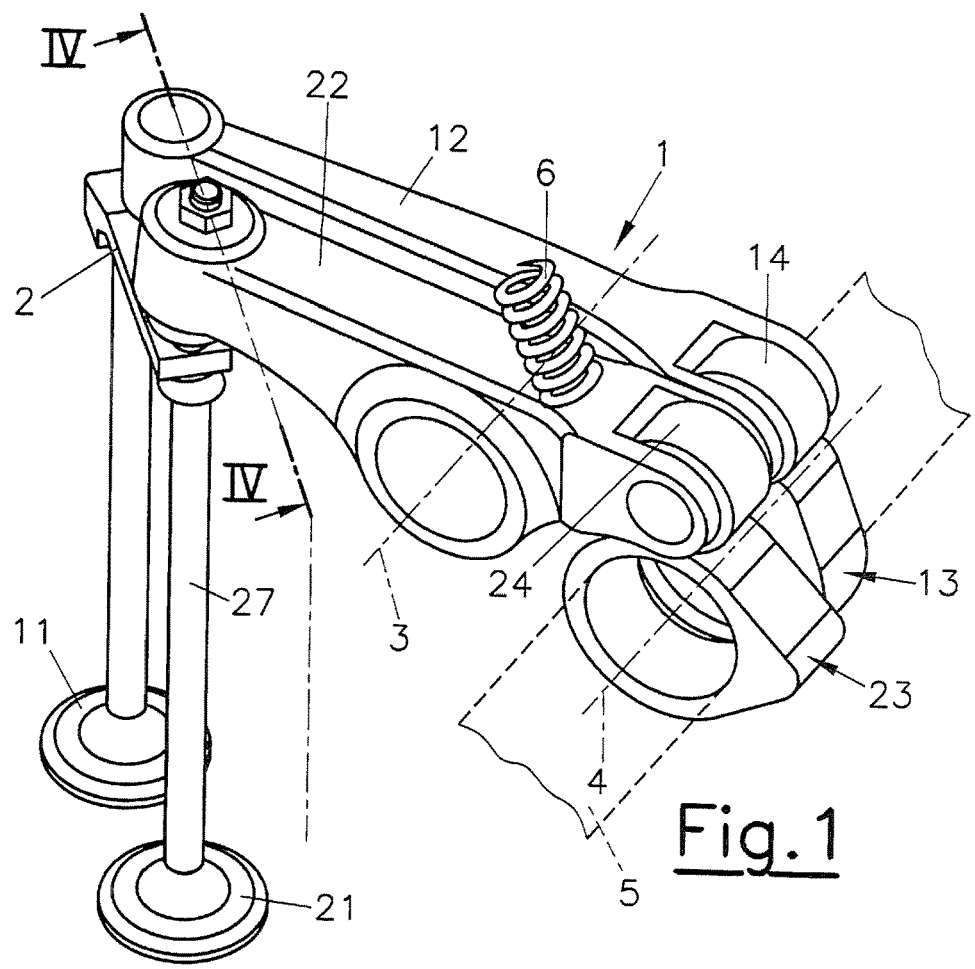
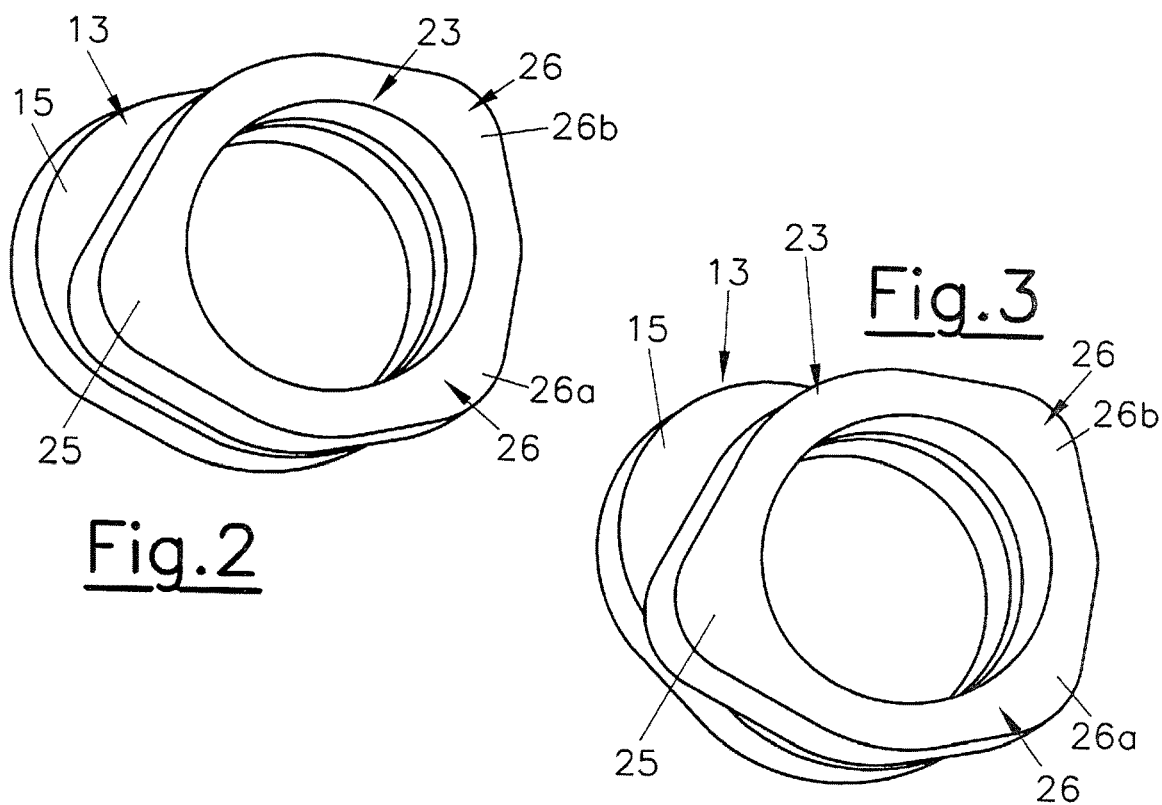

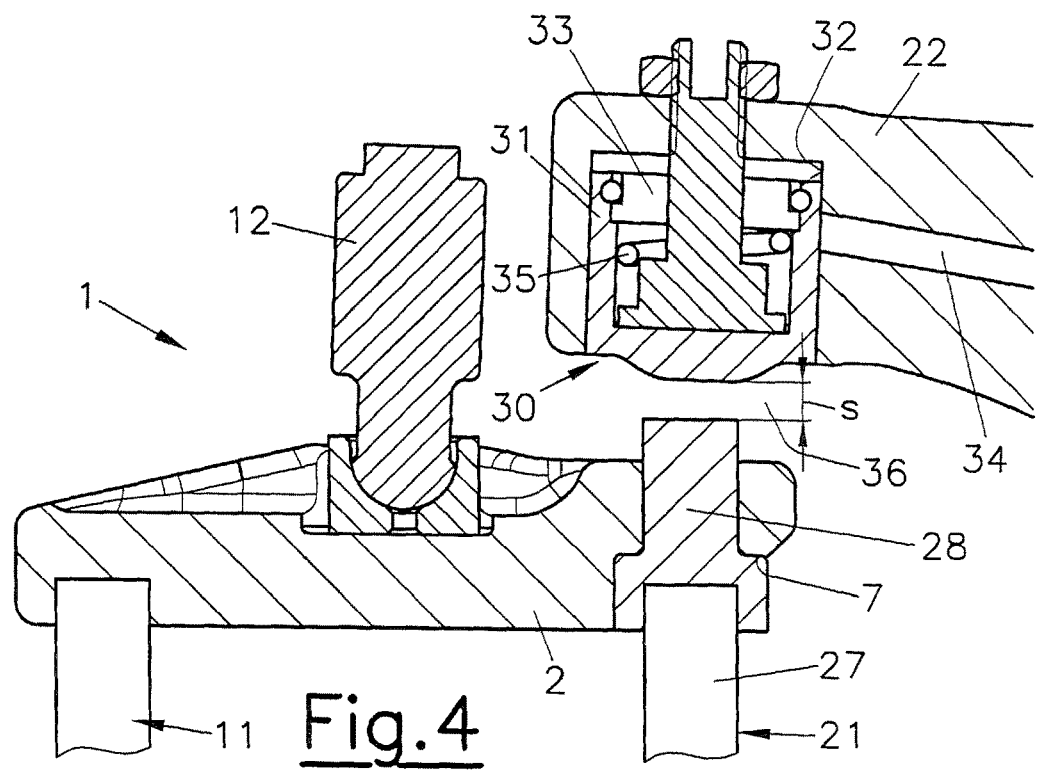
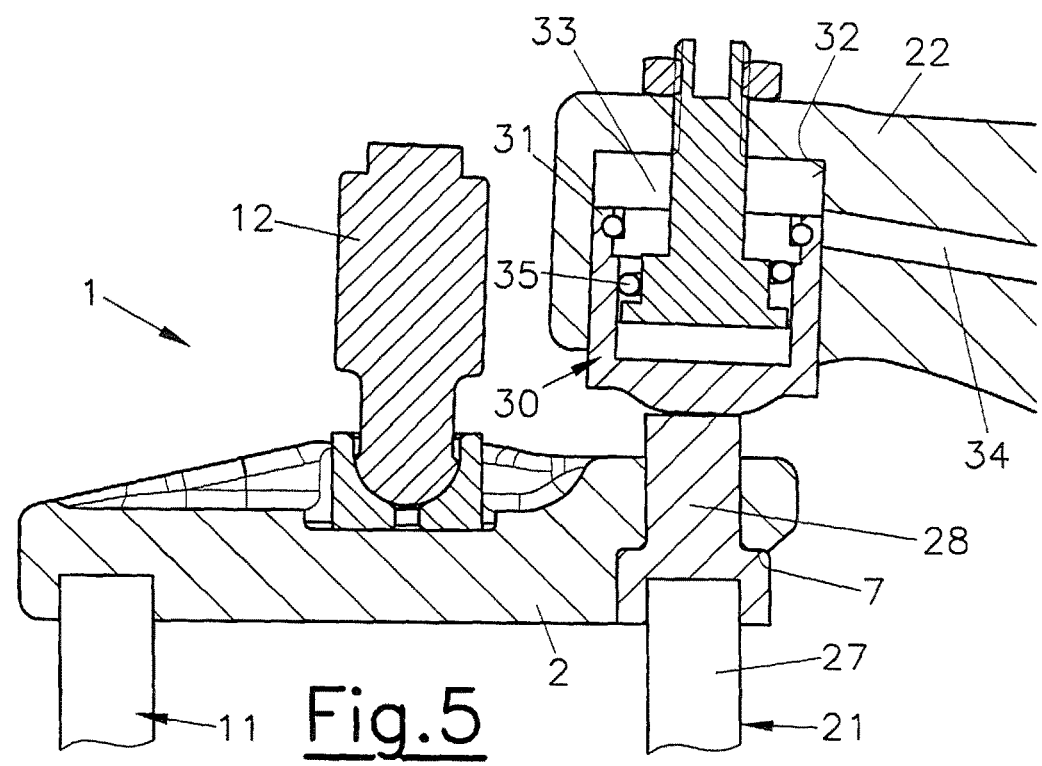

INTERNAL COMBUSTION ENGINE HAVING A VALVE ACTUATION DEVICE

CROSS-REFERENCE TO RELATED APPLICATIONS

This application is a national stage filing based upon International PCT Application No. PCT/AT2017/060183, filed 20 Jul. 2017, which claims the benefit of priority to Austria application No. A 50662/2016, filed 20 Jul. 2016.

BACKGROUND

The invention relates to an internal combustion engine having a valve actuation device, wherein the internal combustion engine has at least one first exhaust valve and one second exhaust valve per cylinder, which can be actuated jointly in at least one operating range of the internal combustion engine via an exhaust valve bridge and a first valve lever by a first cam lobe of a first exhaust cam arranged on a camshaft.

Furthermore, the invention relates to a method for operating an internal combustion engine having at least one first exhaust valve and one second exhaust valve per cylinder, which are jointly actuated in at least one operating range via an exhaust valve bridge and a first valve lever by a first cam lobe of a first exhaust cam arranged on a camshaft.

It is known that in an internal combustion engine its own engine brake valve is arranged in addition to the exhaust valves, which is opened in a clocked or constant manner during engine braking. Such engine brake valves are usually operated hydraulically or pneumatically and are known, for example, from DE 44 23 657 C2, DE 38 39 452 C2, DE 38 39 450 C2, AT 004.387 U1 or AT 003.600 U1. An engine braking device is also known from DE 41 25 831 A1 whose engine brake valve is operated electrically.

Known actuation devices for engine brake valves, however, require a relatively high construction effort and need a comparatively large amount of space in the cylinder head, which in many cases is difficult to provide. To release the cylinder pressure, an additional tank and a high-pressure oil system with high-pressure pump and electro-hydraulic valves are usually required for each cylinder. In addition, well-known engine braking devices have a high number of individual parts which increase the susceptibility to faults and have a disadvantageous effect on the production effort.

U.S. Pat. No. 6,000,374 A describes an engine brake for an internal combustion engine in which several braking phases can be implemented per working cycle. In this case, in addition to intake and exhaust rocker arms, an additional brake rocker arm is provided for each cylinder, which—driven by a brake cam—actuates an exhaust valve. All rocker arms have a hydraulic element at their valve end. Solenoids can be used to influence which hydraulic elements are pressurized with pressure oil and which are not. This ensures that during normal working mode the brake rocker arm only runs empty and the exhaust valve is not actuated via the brake rocker arm because its hydraulic element cannot transmit the force without oil supply. The intake and exhaust rocker arms operate in working mode as long as their hydraulic elements are filled with oil. In braking mode, the hydraulic elements of the exhaust rocker arms are deactivated and the hydraulic elements of the brake rocker arms are activated. In this way it is also possible to manipulate the valve movements hydraulically in order to ensure brake power control and adaptation to any speed. The disadvantage is that a high level of control effort is required.

From WO 2015/177127 A1 a valve train is known for an internal combustion engine, which has per cylinder a first and a second exhaust valve, which can be operated via a valve bridge and a first valve lever by a first exhaust cam together. The second exhaust valve can also be actuated by a second exhaust cam to implement an engine brake via a second valve lever, with a hydraulic transmission device being arranged between the second valve lever and the second exhaust valve. Both the first and the second exhaust cams are connected to a camshaft in a torque-proof manner. The engine brake is activated or deactivated by the hydraulic transmission device.

In addition, the publications U.S. Pat. No. 9,188,030 B2, DE 10 2014 225 054 A1, DE 10 2010 023 571 A1 and WO 11/032632 A1 provide variable valve actuation devices for internal combustion engines in which the control time can be adjusted by relative rotation of two cams of a camshaft. EP 1 945 918 B1 also features a camshaft assembly comprising an inner shaft and an outer shaft, wherein the inner shaft is disposed within the outer shaft rotatable relative to the outer shaft. A first group of cams is connected to the outer tube in a torque-proof manner, a second group of cams is connected to the inner tube in a torque-proof manner.

It is the object of the invention to enable a rapid warm-up of an internal combustion engine of the type mentioned above as simply as possible. Another object is to make it as easy as possible for the exhaust aftertreatment system of such an internal combustion engine to start quickly.

SUMMARY OF THE INVENTION

This object is solved by an initially mentioned internal combustion engine according to the invention in such a way that the camshaft has a second exhaust cam with at least one additional cam lobe, with which the second exhaust valve can be actuated in an engine braking operation of the internal combustion engine, and at least one second cam lobe, wherein a preferably hydraulically switchable transmission device is arranged in the effective path between the second exhaust cam and the second exhaust valve, with which an idle stroke having a defined stroke height can be activated or deactivated and the first exhaust cam is designed such that it can rotate relative to the second exhaust cam and/or the second exhaust cam can rotate relative to the first exhaust cam in various rotational positions, wherein in a projection viewed parallel to the axis of rotation of the camshaft, in at least one first rotational position of the camshaft, the second cam lobe can be covered by the first cam lobe, and in at least one second rotational position, in which the first exhaust cam is rotated about the axis of rotation of the camshaft against the second exhaust cam, the first cam lobe and the second cam lobe can be transmitted to the exhaust valves. In other words, in the second rotational position the first cam lobe is rotated relative to the second cam lobe and the second cam lobe can no longer be covered by the first cam lobe.

The rotatability of the first exhaust cam relative to the second exhaust cam can be realized in a similar way as described in EP 1 945 918 B1: The camshaft can have a first and a second shaft, wherein the two shafts are arranged concentrically to each other and wherein the first shaft can be rotated with respect to the second shaft by means of a phase adjuster. One of the two shafts—for example the first shaft—can be designed as a hollow shaft and the other shaft—for example the second shaft—can be arranged inside the first shaft. The first shaft is advantageously rotatably mounted on the second shaft, wherein the first exhaust cam is connected in a torque-proof manner to the first shaft and the second exhaust cam is connected in a torque-proof manner to the second shaft.

By using the phase adjuster, the first exhaust cams can be shifted to early by rotating the first shaft relative to the second shaft, for example. The control of the second exhaust cam remains unchanged.

According to the invention, the exhaust stroke in a second rotational position can be shifted to earlier or later ("earlier" and "later" are here to be understood both with regard to the crank angle and with regard to a rotation of the crankshaft), whereby with the second cam lobe a further exhaust stroke becomes active. When the start of the exhaust stroke is adjusted to earlier, the second cam lobe extends the exhaust stroke and enables a complete exhaust—the earlier start of the exhaust stroke enables hot exhaust gas to be introduced into the exhaust tract and the exhaust gas aftertreatment components and their heating or holding of the temperature.

In other words, a second cam lobe of the second exhaust cam is designed so that it lies within the normal exhaust stroke defined by the first exhaust cam in at least one rotational position of the first exhaust cam with respect to control time and geometric shape. If the first shaft and thus the first exhaust cam are not rotated in their initial position, the stroke of each first exhaust cam will overlap the stroke of the corresponding adjacent second exhaust cam.

Preferably, the second cam lobe has a maximum stroke height which is equal to or less than the maximum stroke height of the first cam lobe. As an alternative or in addition to this, it may be provided that a stroke or opening duration can be defined with the second cam lobe which is equal to or less than a stroke or opening duration of the first cam lobe.

One variant of the invention provides that the at least one additional cam lobe and the second cam lobe of the second exhaust cam are designed such that the additional cam lobe can only be transmitted to the second exhaust valve when the idle stroke is deactivated and the second cam lobe can be transmitted to the second exhaust valve irrespective of the state of the transmission device. This allows the stroke caused by the additional cam lobe to be activated or deactivated via the state of the transmission device, while the stroke of the second cam lobe is not influenced by the state of the transmission device. "Deactivated" idle stroke here means that there is no idle stroke, but that cam lobes are passed on by the transmission device.

By rotating the first exhaust cam relative to the second exhaust cam and/or by rotating the second exhaust cam relative to the first exhaust cam, the exhaust opening time can be extended in that at least the second cam lobe of the second exhaust cam quasi emerges from the shadow of the exhaust stroke. This makes it possible to maintain or change the opening time of at least one exhaust valve while simultaneously shifting the main outlet.

In a further embodiment of the invention, it is provided that the second exhaust valve can be actuated via a second valve lever by the second exhaust cam independently of the first exhaust valve, wherein preferably the second valve lever is pivotably mounted in the same axis relative to the first valve lever. In a further development of the invention, it may be provided that the second exhaust cam has at least two additional cam lobes, wherein preferably at least one additional cam lobe forms an engine braking stroke. This allows an engine braking operation to be implemented via the additional cam lobes.

It is particularly advantageous if the maximum stroke height of at least one additional cam lobe is smaller than the maximum stroke height of the second cam lobe. This design is particularly advantageous in the effective path of a hydraulic transmission device arranged between the second exhaust cam and the second exhaust valve, with which an idle stroke with a defined stroke height can be activated or deactivated. The second exhaust cam thus fulfils two functions: On the one hand, it can be used—by means of the second cam lobe—to influence, in particular extend, the duration of the exhaust opening. On the other hand, it serves—by means of the additional cam lobe(s)—to enable effective engine braking operation by opening at least one exhaust valve—outside the exhaust stroke—at least once, for example at the end of the intake and/or compression stroke.

Special advantages can be achieved if the idle stroke of the transmission device—preferably adjusted for a transmission ratio of the second valve lever—corresponds at least to the maximum stroke height of at least one additional cam lobe. This makes it possible to switch the engine brake on and off. When the engine brake is switched off, the idle stroke is activated by the transmission device—the deflection of the second valve lever by the additional cam lobe is completely compensated by the idle stroke. Thus the stroke from the additional cam lobe is not passed on to the exhaust valve. Since the maximum stroke of the second cam lobe is greater than the maximum stroke of the additional cam lobe, the difference in stroke between the second cam lobe and the additional cam lobe exceeding the idle stroke is transmitted by the transmission device. However, an opening of the corresponding exhaust valve can only occur if the second exhaust cam lobe of the second exhaust cam is not covered by the first exhaust cam lobe of the first exhaust cam.

In the rest position—i.e. without phase adjustment of the first shaft—the second exhaust cam is covered by the first exhaust cam. If the first shaft is rotated, for example to early, the second cam lobe of the second exhaust cam comes at least partly from the overlap area of the first cam lobe of the first exhaust cam, whereby the exhaust duration is extended. The shape of the second exhaust cam determines the course of the entire exhaust stroke. If the second cam lobe is smaller than the first cam lobe, a step-shaped total exhaust stroke may occur.

The exhaust valve stroke can be adjusted to early by rotating the first exhaust cam. By rotating the second exhaust cam, the exhaust stroke, in particular the exhaust stroke end, can be adjusted to late.

The above-mentioned object is further solved by the above-mentioned method in accordance with the invention in that the camshaft has a second exhaust cam with at least one additional cam lobe, with which at least the second exhaust valve is actuated in at least one engine braking range of the internal combustion engine, and at least one second cam lobe, wherein in at least one first operating range of the internal combustion engine both exhaust valves are actuated simultaneously only by the first exhaust cam, in at least one second operating range of the internal combustion engine the first exhaust cam is rotated relative to the second exhaust cam, wherein in a first phase of the exhaust stroke the first and the second exhaust valves are actuated or kept open simultaneously only by the first exhaust cam and in a second phase of the exhaust stroke the second exhaust valve is actuated or kept open only by the second exhaust cam, in particular the second cam lobe, wherein the stroke transmission between the second exhaust cam and the second exhaust valve is partially interrupted and only strokes exceeding a defined value are transmitted from the second exhaust cam to the second exhaust valve.

In one variant of the invention, the stroke transmission between the second exhaust cam and the second exhaust valve is released in a third engine operating range and at least one braking stroke of the second exhaust valve is carried out at the end of the intake stroke and/or the compression stroke.

By early adjustment of the exhaust valve lobe of the first exhaust cam, rapid heating of the internal combustion engine and early start of exhaust aftertreatment are achieved. At the same time, acoustic problems due to the unrotated second exhaust cam and resulting from residual gas compression can be avoided by prolonging the exhaust opening duration.

Thermodynamic targets can be achieved by rotating the second exhaust cam to late.

BRIEF DESCRIPTION OF THE DRAWINGS

The invention is explained in the following on the basis of the embodiment variants shown in the non-restrictive figures, wherein:

FIG. 1 shows a valve actuation device of an internal combustion engine according to the invention in an oblique view;

FIG. 2 shows a first and a second exhaust cam in an oblique view, in a first rotational position of the first exhaust cam;

FIG. 3 shows a first and a second exhaust cam in an oblique view, in a second rotational position of the first exhaust cam;

FIG. 4 shows a detail of the valve actuating device, in a sectional view according to line IV-IV in FIG. 1, in a first position of the second valve lever;

FIG. 5 shows a detail of the valve actuating device, in a sectional view according to line IV-IV in FIG. 1, in a second position of the second valve lever;

DETAILED DESCRIPTION

Figure 6:
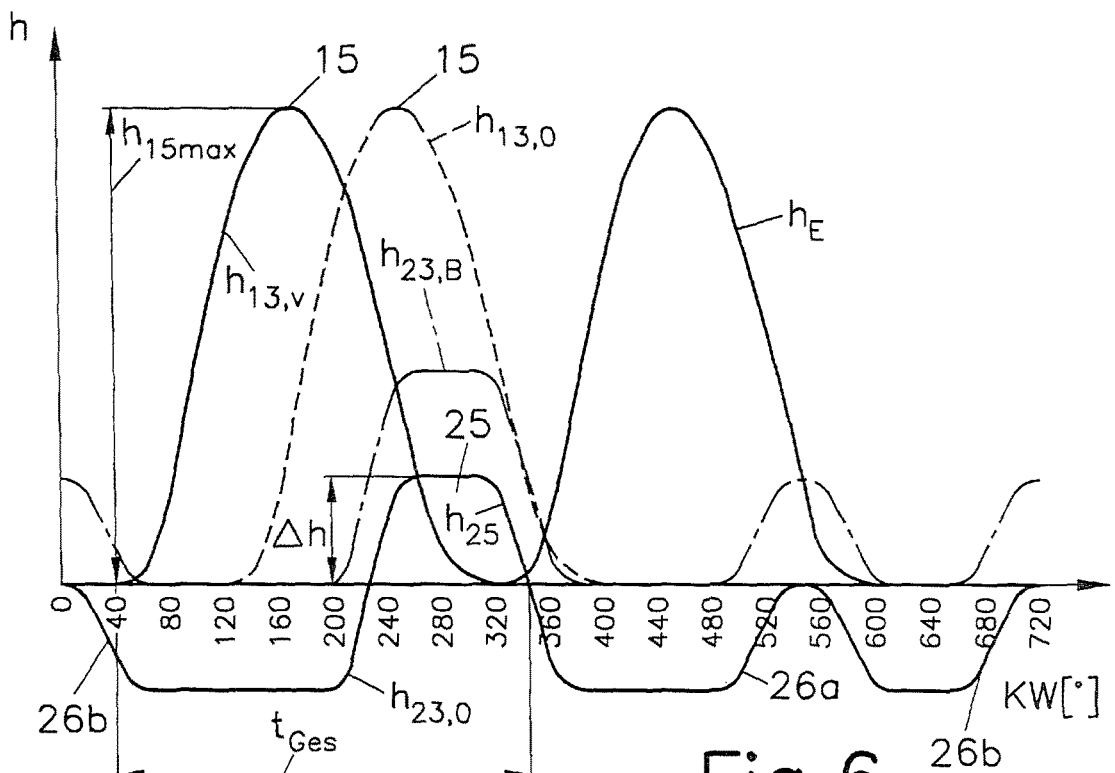
FIG. 6 shows a valve stroke diagram of an internal combustion engine according to the invention in a first embodiment variant with deactivated engine brake.

FIG. 1 shows a valve actuation device 1 of an internal combustion engine of the reciprocating piston type, which has at least two exhaust valves, namely a first exhaust valve 11 and a second exhaust valve 21 per cylinder, which can be actuated jointly via a valve bridge 2 and a first valve lever 12. The first valve lever 12, designed as a rocker arm, is pivotably mounted about a lever axis 3 in the cylinder head of the combustion engine, which is not shown further. The first valve lever 12 is actuated by a first exhaust cam 13 of a camshaft 5 arranged in the cylinder head and rotatable about an axis of rotation 4, the axis of rotation of which is indicated by reference numeral 4, via a first roller 14 rotatably mounted on the first valve lever 12. The first exhaust cam 13 has at least a first cam lobe 15.

In addition, the valve actuation device 1 has a second valve lever 22 adjacent to the first valve lever 12, which is also pivotably mounted about the lever axis 3. The second valve lever 22 is actuated by a second exhaust cam 23 of the camshaft (not shown), which has at least one cam lobe, via a second roller 24 rotatably mounted on the second valve lever 22. Via the second valve lever 22, which is also designed as a rocker arm, the second exhaust valve 21 can be actuated separately from the first exhaust valve 11 by the second exhaust cam 23. The spring 6 presses the second valve lever 22 against the second exhaust cam 23 and prevents the second valve lever 22 from lifting off the exhaust cam 23. With the second valve lever 22, at least one braking stroke can be achieved via the second exhaust cam. Notice shall be taken that for reasons of clarity FIG. 1 represents the second exhaust cam 23 with only one cam lobe—for details see FIG. 2 and FIG. 3 and associated description.

Both the first exhaust cam 13 and the second exhaust cam 23 are arranged on the camshaft 5 and are rotated by it. As shown in EP 1 945 918 B1, the camshaft 5 can have a hollow shaft part and an internal shaft part, wherein the first exhaust cam 13 is connected to the internal shaft part and the second exhaust cam 23 is connected to the external shaft part in a torque-proof manner. The internal shaft part can be rotated relative to the hollow shaft part in the known manner via a phase adjuster. Thus the first 13 and the second exhaust cam 23 can be adjusted against each other, wherein the first exhaust cam 13 can be adjusted against the second exhaust cam 23 to earlier or later. This means that the exhaust stroke resulting from the first cam lobe 15 of the first exhaust cam 13 can be shifted with respect to time before or after the stroke resulting from the at least one second cam lobe of the second exhaust cam 23 (or further strokes realized by additional cam lobes at the second exhaust cam 23). In a first rotational position, the first 13 and second exhaust cams 23 are not rotated against each other, in at least one second rotational position the exhaust cams 13, 23 are rotated against each other. In principle, discrete and continuous rotations of the cams 13, 23 against one another are possible.

As shown in FIG. 2, a total of three cam lobes are formed on the second exhaust cam 23: The second exhaust cam 23 has at least one additional cam lobe 26 designed as a brake cam lobe to enable engine braking operation. The illustrated embodiment example shows a first additional cam lobe 26*a* for carrying out an engine braking stroke at the end of the intake stroke and a second additional cam lobe 26*b* for carrying out an engine braking stroke at the end of the compression stroke. Of course, only one of these additional cam lobes 26*a*, 26*b* can be provided.

In addition, a second cam lobe 25 is provided according to the invention. The maximum stroke height $h_{26max}$ of each additional cam lobe 26*a*, 26*b* is less than the maximum stroke height $h_{25max}$ of the second cam lobe 25. In at least one first rotational position of the first exhaust cam 13, the profile of the second cam lobe 25 of the second exhaust cam 23 can be covered by the first cam lobe 15 of the first exhaust cam 13—viewed in a projection parallel to the axis of rotation 4 of the camshaft 5.

The second cam lobe 25 has a maximum stroke height $h_{25max}$, which in the embodiment example is smaller than the maximum stroke height $h_{15max}$ of the first cam lobe 15. Furthermore, the second cam lobe 25 defines an opening duration $t_{25}$, which in the shown example is smaller than an opening duration $t_{15}$ of the first cam lobe 15. However, it is also conceivable to match the shape and size of the second cam lobe 25 to the first cam lobe 15.

If the first exhaust cam 13 is rotated, for example preadjusted, with respect to the second exhaust cam 23 in at least one second rotational position shown in FIG. 3, the overlapping of the second cam lobe 25 by the first cam lobe 15 is cancelled—again viewed in a projection parallel to the axis of rotation 4 of the camshaft 5. The exhaust stroke caused by the first cam lobe 15 is moved forward with respect to time so that higher temperature exhaust gas from the cylinder or its combustion chamber is fed into the exhaust system, in particular an exhaust aftertreatment system, where it heats the exhaust aftertreatment components located there. In order to prevent the exhaust valves 11, 21 from also closing earlier and thus exhaust gas from remaining in the cylinder or the pressure therein becoming too high, the second cam lobe 25, which has emerged from the shadow of the first exhaust cam 13, acts to keep at least one exhaust valve 11, 21 open. The second cam lobe 25 of the second exhaust cam 23 thus makes it possible to realize an extended exhaust opening despite rotating the first exhaust cam 13.

The rotating can essentially be selected at will, so that the closing time of the exhaust valves 11, 21 remains the same despite pre-rotating of the first cam lobe 15 or is also shifted to earlier. In other words, the second cam lobe 25 can be covered by the first cam lobe 15 in at least one first rotational position of the camshaft 5 in a projection parallel to the axis of rotation 4 of the camshaft 5, and in at least one second rotational position, in which the first exhaust cam 13 is rotated about the axis of rotation 4 of the camshaft 5 against the second exhaust cam 23, the first cam lobe 15 and the second cam lobe 25 can be transmitted to the exhaust valves 11, 21.

Thus, while the second cam lobe 25 is covered according to the invention by the non-rotated first exhaust cam 13 or switched effectively by the rotated first exhaust cam 13, the additional cam lobes 26a, 26b provided for braking operation always act on the second valve lever 22. In order to activate or deactivate the engine braking operation, the valve actuation device 1 has a hydraulically switchable transmission device 30 in the effective path between the second exhaust cam 23 and the second exhaust valve 21. The transmission device 30 shown in FIG. 4 and FIG. 5 in various operating states is arranged in the second valve lever 22 and has an actuating piston 31 which is displaceably mounted in a guide cylinder 32.

The actuating piston 31 is adjacent to a pressure chamber 33, which can be acted upon by a hydraulic medium via a channel 34 arranged in the second valve lever 22. When the pressure chamber 33 is filled, the actuating piston 31 is deflected against the force of a restoring spring 35. In channel 34 or in a line connected thereto, a pressure-maintaining valve and/or control valve which is not shown further is arranged, by means of which the transmission device 30 (and thus the engine braking operation) can be deactivated or activated. FIG. 4 shows the transmission device in the deactivated state in which the pressure chamber 33 is switched to the depressurized state. The actuating piston 31 is thus moved by the restoring spring 35 into its rest position shown in FIG. 4, whereby a play s defining an idle stroke 36 of the transmission device 30 is set between the second exhaust valve 21—more precisely between a valve tappet 28 acting on the valve stem 27 of the second exhaust valve part 21—and the actuating piston 31. The idle stroke 36 corresponds at least to the stroke heights $h_{26}$ of at least one additional cam lobe 26. Thus only deflections of the second valve lever 21 which are greater than the idle stroke 36 are transmitted to the second exhaust valve 21. The maximum effective stroke as a result of the second cam lobe 25 thus corresponds to the difference $\Delta h$ between the maximum stroke heights $h_{25max}$-$h_{26max}$. This means that when the transmission device 30 is deactivated, no strokes $h_{26}$ of the additional cam lobes 26 are transmitted, but only strokes $h_{25}$ of the second cam lobe 25 which exceed the idle stroke 36.

FIG. 5 shows the transmission device 30 in the activated, i.e. hydraulically rigidly switched, state. In this case, the pressure chamber 33 is acted upon by the hydraulic medium—e.g. lubricating oil of the internal combustion engine—under pressure, wherein the piston is pressed against the restoring force of the restoring spring 35 in FIG. 5 in the engine braking position shown, at which the actuating piston 31 is in contact with the valve stem 27 or the valve tappet 28. Since the pressure is maintained in the pressure chamber 33, the deflection of the second valve lever 22 is transmitted undiminished to the second exhaust valve 21. Since the valve tappet 28 is mounted in the valve bridge 2 so that it can move in the opening stroke direction of the second exhaust valve 21 and is supported in the closing direction of the second exhaust valve 21 by a shoulder 7 of the valve bridge 2, the second exhaust valve 21 can be opened independently of the first exhaust valve 11 by means of the second valve lever 22. This allows the second exhaust valve 21 to be actuated by the transmission device 30 during braking operation without the valve bridge 2 being co-moved.

Figure 7:
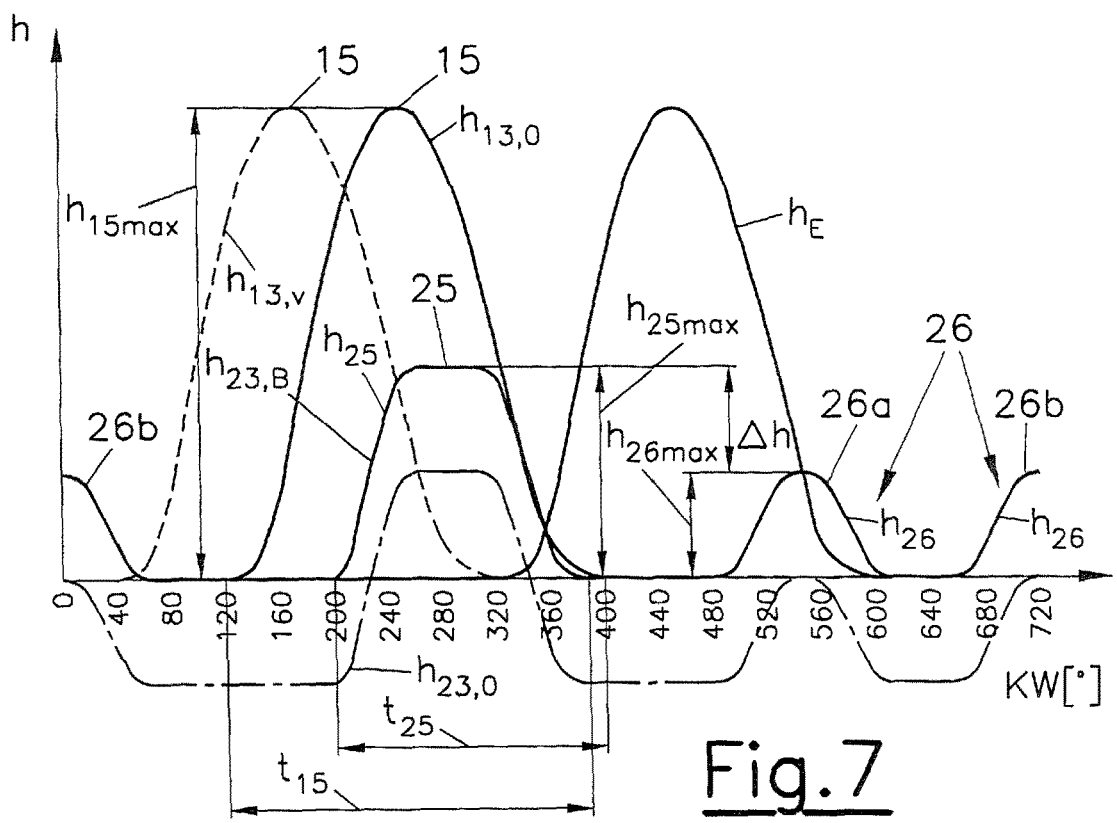
FIG. 7 shows a valve stroke diagram of this internal combustion engine with activated engine brake.

In FIG. 6 and FIG. 7 the valve strokes h of the intake valves and the exhaust valves 11, 21 above the crank angle KW for a working cycle of an internal combustion engine are shown in a first embodiment variant. The intake valve curves are designated with $h_E$, the exhaust valve stroke curve of the first exhaust cam 13 with $h_{13}$ and the exhaust valve stroke curve of the second exhaust cam 23 with $h_{23}$. The stroke of the exhaust valves 11, 21 with the unrotated first position of the first exhaust cam 13 is designated with $h_{13,0}$ and the stroke of the exhaust valves 11, 21 with the first exhaust cam 13 rotated relative to the second exhaust cam 23 with $h_{13,v}$. The stroke as a result of the second exhaust cam 23 with engine brake deactivated is designated with $h_{23,0}$ and the stroke as a result of the second exhaust cam 23 with engine brake activated with $h_{23,B}$. Activated and deactivated engine brake here designates the operating states of the hydraulic transmission device 30 described in connection with FIG. 4 and FIG. 5.

As illustrated in FIG. 6 and FIG. 7, different operating modes can be realized with the valve actuation device 1 described above: Normal operation, engine braking operation and extended or delayed exhaust operation.

In normal operation, as shown in FIG. 2, the second cam lobe 25 of the second exhaust cam 23 for the exhaust stroke extension is covered by the first exhaust cam 13. Furthermore, as shown in FIG. 4, the actuating piston 31 is retracted in the second valve lever 22, as a result of which the second cam lobe 25 results in only a reduced stroke $\Delta h$ instead of the full stroke $h_{25}$ in engine braking operation (see $h_{23,B}$), see line $h_{23,0}$ in FIG. 6. As this reduced stroke $\Delta h$ is located in normal operation within the stroke $h_{13,0}$ of the exhaust valves 11, 21 indicated by a dashed line in FIG. 6, the second valve lever 22 therefore has no function. The first valve lever 12 actuates both exhaust valves 11, 21 via valve bridge 2.

In engine braking operation, as shown in FIG. 5, the actuating piston 31 is extended in the second valve lever 22 by means of oil pressure, whereby the full stroke $h_{25}$ is carried out as a result of the second cam lobe 25 of the second exhaust cam 23, see FIG. 7. This results in additional braking strokes $h_{26}$ due to the additional cam lobes 26 on the second exhaust valve 21 at the end of the intake stroke $h_E$ and before the exhaust stroke $h_{13}$. The increased stroke $h_{25}$ due to the second cam lobe of the second exhaust cam 23 is still covered by the normal exhaust stroke $h_{13,0}$ caused by the first exhaust cam 13.

The second valve lever 22 can thus be used to implement the function of an engine brake by actuating the second exhaust valve directly through the additional cam lobes 26.

The second valve lever 22 can be activated by an additional hydraulic system which bridges a play s between the second valve lever 22 and the second exhaust valve 21. This bridgeable play s is designed in such a way that when the transmission direction 30 is in the deactivated state it completely eliminates the brake valve stroke, wherein the second valve lever 22 performs the movement of the additional cam lobes 26, but there is no contact with the second exhaust valve 21 due to the play s.

In extended exhaust operation, as shown in FIG. 3, the first exhaust cam 13 is turned into an early position by means of the phase adjuster (not shown) of the camshaft 5 and the actuating piston 31 in the second valve lever 22 is moved into the rest position shown in FIG. 4. This shifts the exhaust stroke curve $h_{13}$ into the early position indicated by line $h_{13,v}$ in FIG. 6, wherein the reduced stroke curve of the second exhaust cam 23 indicated by line $h_{23,0}$ is effective. Due to the forward shifting of the exhaust stroke curve $h_{13}$ of the first exhaust cam 13, the reduced stroke $\Delta h$ defined by the second cam lobe 25 is no longer covered and thus extends the exhaust opening time of at least the second exhaust valve 21 to $t_{Ges}$ (see FIG. 6).

By early adjustment of the exhaust valve stroke of the first exhaust cam 13, rapid heating of the internal combustion engine and early starting of an exhaust aftertreatment device—not further described—can be achieved. In addition, acoustic problems caused by residual gas compression can be avoided by extending the exhaust opening duration by the unrotated second exhaust cam 23.

Figure 8:
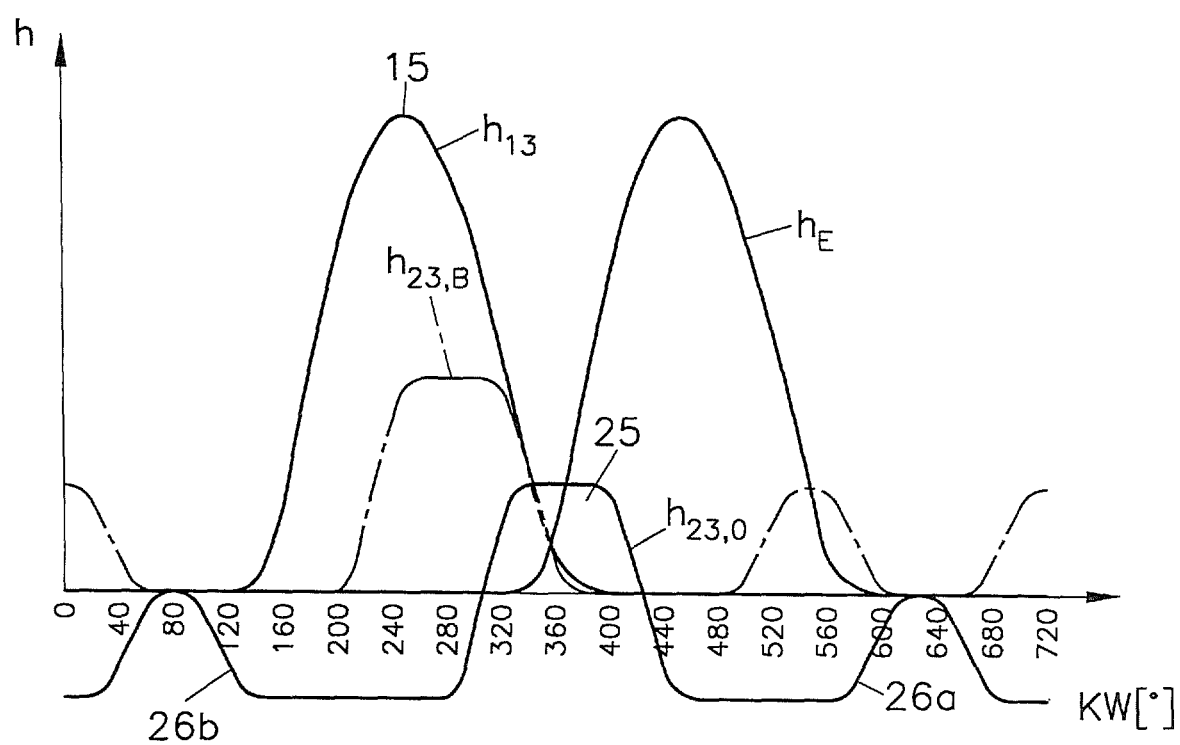
FIG. 8 shows a valve stroke diagram of an internal combustion engine in accordance with the invention in a second embodiment variant with deactivated engine brake.

FIG. 8 shows the valve strokes h of the intake valves and the exhaust valves 11, 21 above the crank angle KW for an operating cycle of an internal combustion engine in a second embodiment variant of the invention, in which the second exhaust cam 23 can be rotated relative to the first exhaust cam 13 by the phase adjuster. In extended exhaust operation, the second exhaust cam 23 is turned into a late position by means of the phase adjuster of the camshaft 5 and the actuating piston 31 in the second valve lever 22 is moved into the rest position shown in FIG. 4. As a result, the reduced stroke curve $h_{23,0}$ of the second exhaust cam 23 is shifted into the late position and steps out of the shadow of the stroke curve $h_{13}$ of the first exhaust cam 13, with which it becomes effective. Due to the late shifting of the exhaust stroke curve $h_{23,0}$ of the second exhaust cam 23, the reduced stroke $\Delta h$ defined by the second cam lobe 25 is no longer covered and thus extends the exhaust opening time of at least the second exhaust valve 21. This function is used to achieve thermal targets.

The invention claimed is:

1. Internal combustion engine having a valve actuation device, wherein the internal combustion engine comprises:
   at least one first exhaust valve and one second exhaust valve per cylinder, the at least one first and second exhaust valves are configured and arranged, in at least one operating range of the internal combustion engine, to be actuated together via an exhaust valve bridge and a first valve lever by a first cam lobe of a first exhaust cam arranged on a camshaft;
   the camshaft has a second exhaust cam with at least one additional cam lobe and at least one second cam lobe, the at least one additional cam lobe configured and arranged to actuate the second exhaust valve in an engine braking operation of the internal combustion engine; and
   a transmission device arranged in the effective path between the second exhaust cam and the second exhaust valve, the transmission device configured and arranged to activate or deactivate an idle stroke having a defined stroke height; and
   wherein the first exhaust cam and the second exhaust cam are configured and arranged to be rotatable relative to one another, into different rotational positions, and wherein as viewed in a projection parallel to the axis of rotation of the camshaft, in at least one first rotational position of the camshaft, the second cam lobe is covered by the first cam lobe, and in at least one second rotational position, in which the first exhaust cam is rotated about the axis of rotation of the camshaft against the second exhaust cam, the first cam lobe and the second cam lobe are transmitted to the exhaust valves.

2. The internal combustion engine according to claim 1, characterized in that the second cam lobe has a maximum stroke height which is equal to or less than a maximum stroke height of the first cam lobe.

3. The internal combustion engine according to claim 1, characterized in that the at least one additional cam lobe and the second cam lobe of the second exhaust cam are configured and arranged such that the additional cam lobe is transmitted to the second exhaust valve in response to idle stroke deactivation, and the second cam lobe is transmitted to the second exhaust valve independently of the state of the transmission device.

4. The internal combustion engine according to claim 1, characterized in that an opening duration is equal to or less than an opening duration of the first cam lobe is defined with the second cam lobe.

5. The internal combustion engine according to claim 1, characterized in that the second exhaust valve is actuated via a second valve lever by the second exhaust cam, independently of the first exhaust valve.

6. The internal combustion engine according to claim 5, characterized in that the second valve lever is mounted so as to be pivotable in the same axis relative to the first valve lever.

7. The internal combustion engine according to claim 1, characterized in that the second exhaust cam has at least two additional cam lobes.

8. The internal combustion engine according to claim 2, characterized in that a maximum stroke height of at least one additional cam lobe is smaller than the maximum stroke height of the second cam lobe.

9. The internal combustion engine according to claim 1, characterized in that the idle stroke of the transmission device corresponds at least to the maximum stroke height of at least one additional cam lobe.

10. A method for operating an internal combustion engine, the internal combustion engine having a valve actuation device with at least one first exhaust valve and one second exhaust valve per cylinder, which are jointly actuated in at least one operating range via an exhaust valve bridge and a first valve lever by a first cam lobe of a first exhaust cam arranged on a camshaft, wherein the camshaft has a second exhaust cam with at least one additional cam lobe, with which at least the second exhaust valve is actuated in at least one engine braking range of the combustion engine, and at least one second cam lobe, the method comprising:
   in at least one first operating range of the internal combustion engine, simultaneously actuating both exhaust valves via the first exhaust cam;
   in at least one second operating range of the internal combustion engine, rotating the first exhaust cam and the second exhaust cam relative to one another;

in a first phase of the exhaust stroke, the first and the second exhaust valves are actuated open or kept open simultaneously by the first exhaust cam;

in a second phase of the exhaust stroke, the second exhaust valve is actuated open and kept open by the second cam lobe of the second exhaust cam;

partially interrupting the stroke transmission between the second exhaust cam and the second exhaust valve; and transmitting only strokes exceeding a defined value from the second exhaust cam to the second exhaust valve.

11. The method according to claim 10, further including in a third engine operating range, releasing the stroke transmission between the second exhaust cam and the second exhaust valve, and performing at least one braking stroke of the second exhaust valve at the end of the intake stroke and/or the compression stroke.

12. The internal combustion engine according to claim 7, wherein at least one additional cam lobe forms an engine braking stroke.

13. The internal combustion engine according to claim 9, wherein the idle stroke is adjusted for a transmission ratio of the second valve lever.

14. The internal combustion engine according to claim 1, wherein the transmission device is configured and arranged to hydraulically actuate stroke height.

* * * * *